United States Patent
Yano et al.

(10) Patent No.: US 6,876,146 B2
(45) Date of Patent: Apr. 5, 2005

(54) ELECTROLUMINESCENCE PHOSPHOR MULTILAYER THIN FILM AND ELECTROLUMINESCENCE ELEMENT

(75) Inventors: Yoshihiko Yano, Tokyo (JP); Masaki Takahashi, Tokyo (JP); Tomoyuki Oike, Tokyo (JP); Naruki Kataoka, Tokyo (JP)

(73) Assignee: TDK Corporation, Tokyo (JP)

( * ) Notice: Subject to any disclaimer, the term of this patent is extended or adjusted under 35 U.S.C. 154(b) by 57 days.

(21) Appl. No.: 10/394,150

(22) Filed: Mar. 24, 2003

(65) Prior Publication Data

US 2004/0033363 A1 Feb. 19, 2004

(30) Foreign Application Priority Data

Mar. 26, 2002 (JP) ........................................ 2002-087013

(51) Int. Cl.[7] .................................................. H01J 1/62
(52) U.S. Cl. ................. 313/506; 313/503; 252/301.4 R
(58) Field of Search ................................ 428/690, 917; 252/301.6 S, 301.4 R; 313/498–512; 445/24

(56) References Cited

U.S. PATENT DOCUMENTS

| 4,751,427 | A | | 6/1988 | Barrow et al. | |
|---|---|---|---|---|---|
| 5,314,759 | A | * | 5/1994 | Harkonen et al. | 428/690 |
| 5,554,449 | A | * | 9/1996 | Tonomura et al. | 428/690 |
| 5,602,445 | A | * | 2/1997 | Solanki et al. | 313/503 |
| 5,643,829 | A | * | 7/1997 | Kang | 313/503 |
| 6,403,204 | B1 | * | 6/2002 | Kitai et al. | 428/212 |

FOREIGN PATENT DOCUMENTS

| JP | A 1-206594 | 8/1989 |
|---|---|---|
| JP | A 2-51891 | 2/1990 |
| JP | A 2-148688 | 6/1990 |
| JP | A 3-141586 | 6/1991 |
| JP | A 5-65478 | 3/1993 |
| JP | A 9-35869 | 2/1997 |
| JP | A 10-270168 | 10/1998 |
| JP | A 2001-126860 | 5/2001 |
| JP | A 2001-262140 | 9/2001 |
| WO | WO 97/02721 | 1/1997 |
| WO | WO 98/33359 | 7/1998 |

OTHER PUBLICATIONS

Tadatsugu Minami; "Oxide Phosphor Thin–Film Electroluminescent Devices"; Display and Imaging; 1999; vol. 8; pp 83–93.

Michitaka Ohura et al.; "Properties of Red–Color CaS:Eu Thin Film El Device"; ITEJ Technical Report; Nov. 27, 1992; vol. 16, No. 76; pp 7–11.

* cited by examiner

*Primary Examiner*—Vip Patel
*Assistant Examiner*—German Colón
(74) *Attorney, Agent, or Firm*—Oliff & Berridge, PLC (57) ABSTRACT

The present invention aims at realizing a phosphor thin film having a high luminance with a low emission threshold voltage, and an EL element comprising the same. The EL element of the present invention comprises a substrate, and a lower electrode, a lower buffer thin film containing a sulfide such as ZnS, a phosphor thin film containing an oxide such as a gallate as a matrix material, an upper buffer thin film containing a sulfide such as ZnS, and an upper electrode which are successively laminated on the substrate.

8 Claims, 4 Drawing Sheets

ELECTROLUMINESCENCE PHOSPHOR MULTILAYER THIN FILM AND ELECTROLUMINESCENCE ELEMENT

BACKGROUND OF THE INVENTION

1. Field of the Invention

The present invention relates to an EL (electroluminescence) element and an EL phosphor used therefor, a thin film multilayer structure of an oxide EL phosphor in particular.

2. Related Background Art

Figure 6:
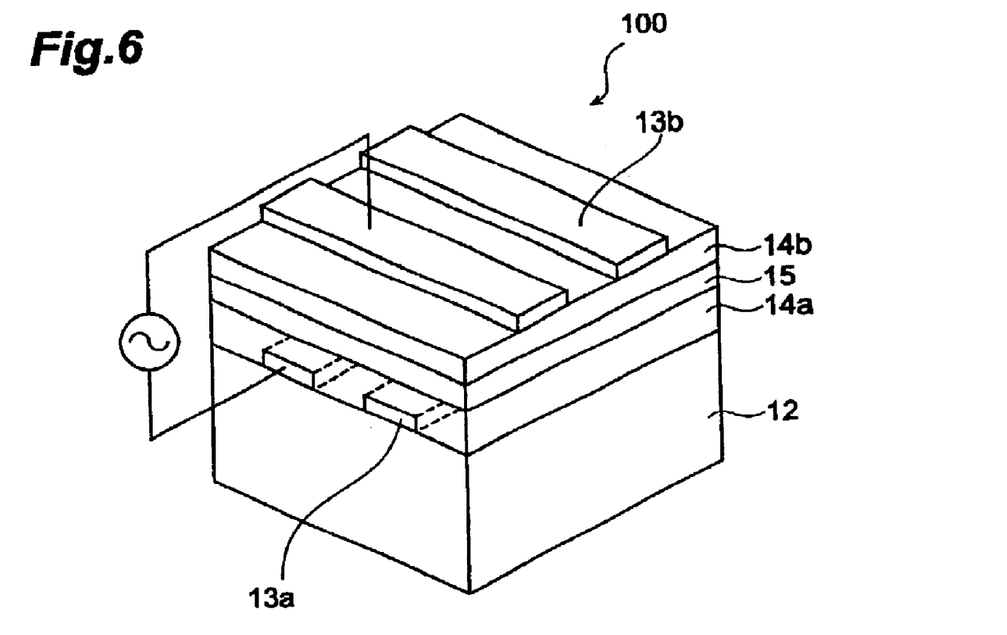
FIG. 6 is a perspective view schematically showing an example of conventional EL display.

In recent years, studies of thin film EL elements as large-size, lightweight flat display panels have been actively under way. FIG. 6 is a perspective view schematically showing an example of conventional EL display. This EL element 100 is a monochromatic EL display comprising a phosphor thin film made of yellowish-orange-emitting, manganese-doped zinc sulfide (ZnS:Mn) disposed between two thin film insulating layers. It has a so-called double insulating structure and has already been in actual use.

Specifically, a lower electrode 13a having a predetermined pattern is formed on a substrate 12 made of glass, whereas a dielectric thin film is formed as a lower insulating layer 14a on the lower electrode 13a. A light-emitting layer 15 made of a phosphor thin film, and an upper insulating layer 14b are successively formed on the lower insulating layer 14a. On the upper insulating layer 14b, an upper electrode 13b is formed with a predetermined pattern so as to constitute a matrix electrode with the lower electrode 13a. For making the light-emitting layer 15, the phosphor thin film is usually formed and then is annealed at a temperature not higher than the strain point of the substrate 12, in order to improve luminance.

Also, a structure using ceramics for the substrate 12 and a thick film dielectric layer for the lower insulating layer 14a has recently been proposed. Further, a device structure using a $BaTiO_3$ thin sheet, formed with an electrode on one side, exhibiting a high dielectric constant as the lower insulating layer 14a and substrate 12 has been proposed. Since such a structure uses ceramics such as alumina and $BaTiO_3$ as the substrate, the light-emitting layer 13 made of a phosphor thin film can be annealed at a higher temperature, thus achieving higher luminance.

Also, since a dielectric layer constituted by a thick film or thin sheet is used as the lower insulating layer 14a, the above-mentioned structure is stronger against dielectric breakdown than those using a thin film for the lower insulating layer 14a, whereby a highly reliable device can be obtained.

Here, the double insulating structure is not always necessary, whereas the structure may have a thick film or thin sheet dielectric layer alone as its insulating layer.

Meanwhile, displays currently in use for PCs, TVs, and other display purposes are required to show colors. Though thin-film EL displays using sulfide phosphor thin films are excellent in reliability and environmental resistance, they have not yet been considered suitable for use in color displays, since characteristics of EL phosphors emitting three primary colors of red, green, and blue are not sufficient.

Here, the following materials have been listed as candidates for materials for red, green, and blue, and their studies have been under way. Examples of blue-emitting phosphors include SrS:Ce using SrS as a matrix material and Ce as a luminescent center, $SrGa_2S_4$:Ce, and ZnS:Tm. Examples of red-emitting phosphors include ZnS:Sm and CaS:Eu. Examples of green-emitting phosphors include ZnS:Tb and CaS:Ce.

These phosphor thin films emitting three primary colors of red, green, and blue have not yet been considered sufficient in terms of light-emitting luminance, efficiency, and color purity, so that no color EL elements using them have come into actual use yet. In particular, though green emission with a relatively high luminance has been attained by using SrS:Ce, its color purity is too shifted to the green side to be used for blue in a full-color display, thus demanding a blue-light-emitting layer with a higher blue color purity to be developed.

For solving this problem, as set forth in Japanese Patent Application Laid-Open Nos. HEI 7-122364 and HEI 8-134440, *IEICE Technical Report*, EID 98–113, pp. 19–24, and *Jpn. J. Appl. Phys.* Vol. 38 (1999), pp. L1291–1292, blue-emitting phosphors of thiogallate or thioaluminate type excellent in luminance and color purity have been under development.

Thus, sulfide composition systems expanded from zinc sulfide (ZnS) to two- or three-member sulfides have widely been used as phosphors for EL elements so far. However, sulfide materials in general have the drawback of being susceptible to water and moisture. For example, $Al_2S_4$ reacts with water in the air, thereby changing into $Al_2O_3$ while generating $H_2S$. Therefore, when a phosphor made of a sulfide material is employed in an EL element, means for blocking water and protecting the element must be provided from the viewpoint of phosphor life. This will complicate the element structure.

Under these circumstances, the research and development of high-luminance EL elements using chemically stable oxide type phosphors in their light-emitting layers has recently been gaining momentum. For example, EL materials with various emission colors have been proposed in *Display and Imaging*, Vol. 8 suppl., pp. 83–93.

SUMMARY OF THE INVENTION

The inventors studied characteristics of EL elements using such oxide type phosphors in detail and, as a result, have found that their application voltage for emission (threshold voltage) is at 300 to 600 V, and thus is higher than that of sulfide phosphor materials, whereas no abruptness is seen in a curve (L-V curve) representing the luminance vs. voltage characteristic. Therefore, in an EL element using an oxide type phosphor, an excessive load is exerted on IC for matrix-driving an actual EL panel, thus making it substantially impossible to be driven with commercially available ICs at present.

In view of such circumstances, it is an object of the present invention to provide an EL phosphor multilayer thin film which can fully lower the emission start voltage (also referred to as "emission threshold voltage") so as to exhibit a steep rising characteristic in the L-V curve while being able to improve luminance, and an EL element comprising the same.

For achieving the above-mentioned object, the inventors studied characteristics of EL elements having $Ga_2O_3$:Eu thin films formed by conventional methods in detail and, as a result, have verified that these EL elements have a high emission threshold voltage of 260 V and a light-emitting luminance of about 80 cd/m² at an application voltage of 300 V when driven at 1 kHz, thus being insufficient in terms of both light-emitting threshold voltage and luminance to be employed in a practical EL panel comprising an EL element.

Based on these findings, the inventors conducted further studies, thereby accomplishing the present invention.

The present invention provides an EL phosphor multilayer thin film disposed on a substrate, the EL phosphor multilayer thin film comprising, successively laminated from the substrate side, a lower buffer thin film containing a sulfide, a phosphor thin film containing a matrix material made of an oxide and a luminescent center, and an upper buffer thin film containing a sulfide.

In thus configured EL phosphor multilayer thin film, lower and upper buffer thin films containing a sulfide are formed on both sides of a phosphor thin film made of an oxide matrix material. These buffer thin films enhance electron injection effects into the phosphor thin film, thereby lowering the emission threshold voltage and improving the luminance.

Preferably, from the view point of strengthening the function of the buffer thin films as electron injection layers, their film thickness is regulated so as to have a predetermined value. Specifically, it will be preferred if each of the lower and upper buffer thin films has a thickness of 20 to 300 nm.

More specifically, it is preferred that the sulfide contained in the lower and upper buffer thin films be zinc sulfide.

Preferably, the EL phosphor multilayer thin film further comprises an intermediate layer, disposed between the phosphor thin film and at least one of the lower and upper buffer thin films, containing at least one of an oxide and a nitride. This restrains peeling from occurring in interfaces in the laminate structure in the EL phosphor multilayer thin film, thereby keeping dark spots from occurring because of such peeling. Preferably, the intermediate layer has a thickness of 30 to 80 nm.

More preferably, the EL phosphor multilayer thin film further comprises an upper electron injection thin film, disposed on a side of the upper buffer opposite from the side provided with the phosphor thin film, containing at least one of an oxide and a nitride; or a lower electron injection thin film, disposed between the substrate and the lower buffer thin film, containing at least one of an oxide and a nitride.

These electron injection thin films further enhance the electron injection efficiency into the phosphor thin film. From this viewpoint, it will be more preferable if both of the electron injection thin films are provided.

Specifically, it will be particularly preferable if at least one of the buffer thin films of the upper and lower electron injection thin films has a thickness of 5 to 150 nm, and it will be useful if these electron injection films are made of aluminum oxide.

The present invention provides an EL element comprising a substrate and the EL phosphor multilayer thin film of the present invention formed thereon, i.e., an EL phosphor thin film, disposed on a substrate, comprising, successively from the substrate side, a lower buffer thin film containing a sulfide, a phosphor thin film containing a matrix material made of an oxide and a luminescent center, and an upper buffer thin film containing a sulfide.

The present invention can also be described as follows:

(a) An EL phosphor multilayer thin film, formed on a substrate, comprising, successively from the substrate side, a lower buffer thin film containing a sulfide, a phosphor thin film containing a matrix material made of an oxide and a luminescent center, and an upper buffer thin film containing a sulfide, each of the lower and upper buffer thin films having a thickness of 20 to 300 nm.

(b) An EL phosphor multilayer thin film according to (a), wherein the sulfide contained in the lower and upper buffer thin films is zinc sulfide.

(c) An EL phosphor multilayer thin film according to (a) or (b), further comprising respective intermediate layers disposed between the phosphor thin film and the lower buffer thin film and between the phosphor thin film and the upper buffer thin film, each containing an oxide and/or a nitride and having a thickness of 30 to 80 nm.

(d) An EL phosphor multilayer thin film according to any of (a) to (c), further comprising an upper electron injection thin film, disposed on a side of the upper buffer thin film opposite from the phosphor thin film, containing an oxide and/or a nitride and having a thickness of 5 to 150 nm.

(e) An EL phosphor multilayer thin film according to (d), wherein the oxide contained in the upper electron injection thin film is aluminum oxide.

(f) An EL phosphor multilayer thin film according to (d) or (e), further comprising a lower electron injection thin film, disposed between the substrate and the lower buffer thin film, containing an oxide and/or a nitride having a thickness of 5 to 150 nm.

g) An EL phosphor multilayer thin film according to (f), wherein the oxide contained in the lower electron injection thin film is aluminum oxide.

(h) An EL element having the EL phosphor multilayer thin film according to any of (a) to (g).

DESCRIPTION OF THE PREFERRED EMBODIMENTS

In the following, embodiments of the present invention will be explained in detail. In the explanation of the drawings, constituents identical to each other will be referred to with numerals identical to each other without repeating their overlapping descriptions. For convenience of illustration, ratios of dimensions in the drawings are not restrictive and do not always match those explained. Positional relationships such as upper/lower and left/right will be based on those in the drawings unless otherwise specified.

First Embodiment

Figure 5:
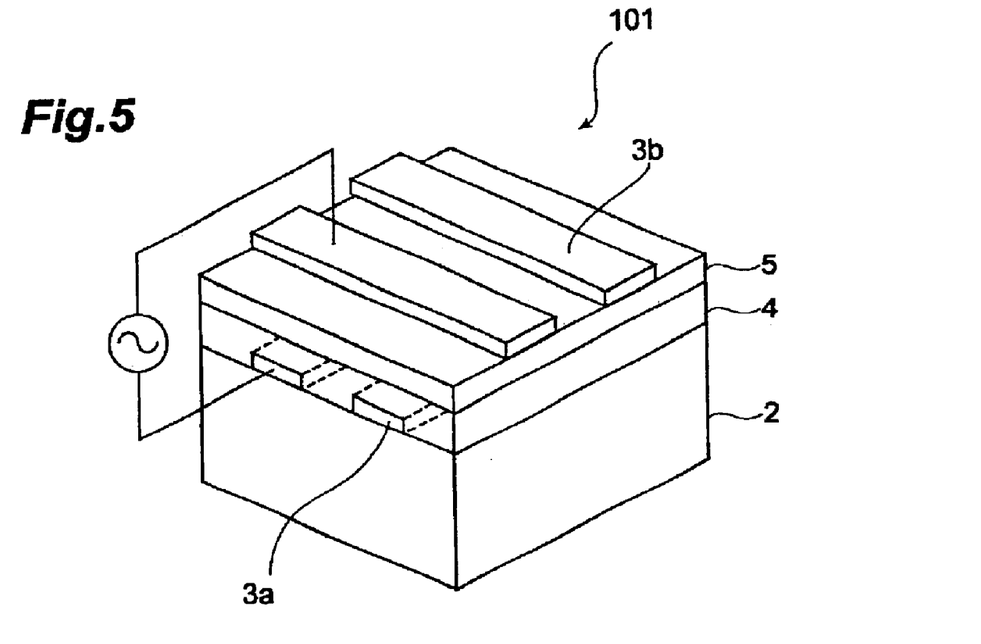
FIG. 5 is a sectional view showing a major part of a first embodiment of the EL element in accordance with the present invention.

FIG. 5 is a perspective view showing a major part of a first embodiment of the EL element in accordance with the present invention. This El element 101 comprises a substrate 2, and a lower electrode 3*a*, an insulating layer 4, a light-emitting layer 5, and an upper electrode 3*b* which are successively laminated on the substrate 2. An AC power supply is connected between the lower electrode 3a and upper electrode 3b.

Substrate 2

The material used as the substrate 2 preferably has a heat resistance temperature or melting point of at least 600° C., more preferably at least 700° C., further preferably at least 800° C., so as to be able to endure the temperature for forming individual layers constituting the EL element 101 and the temperature for annealing, which will be explained later, carried out at the time of forming the EL element.

The material is not restricted in particular as long as functional thin films such as the light-emitting layer 5 formed on the substrate 2 can be laminated so as to form an EL element while a predetermined strength can be maintained.

Specific examples of the material include glass; ceramic substrates such as alumina ($Al_2O_3$), forsterite ($2MgO.SiO_2$), steatite ($MgO.SiO_2$), mullite ($3Al_2O_3.2SiO_2$), beryllia (BeO), aluminum nitride (AlN), silicon nitride ($Si_3N_4$), and silicon carbide (SiC+BeO); and heat-resistant-glass substrates such as crystalline glass.

Among them, alumina substrates and crystalline glass substrates are preferable in particular, since their heat-resistant temperature is about 1000° C. or higher. When thermal conductivity is necessary, beryllia, aluminum nitride, silicon carbide, and the like are preferably used.

In addition, silica, thermally oxidized silicon wafers, and metal substrates such as titanium, stainless steel, Inconel, and iron types can also be used. When using an electrically conductive substrate such as a metal, a structure in which a thick film having an electrode therewithin is formed on the substrate 2 is preferable.

Electrodes 3a, 3b

The lower electrode 3a is usually formed within the insulating layer 4. The lower electrode 3a is exposed to a high temperature when heat-treating the light-emitting layer 5, and will also be exposed to a high temperature when forming the insulating layer 4 if the latter is constituted by a thick film which will be explained later. Therefore, the lower electrode 3a preferably has an excellent heat resistance, and is more preferably a metal electrode.

Examples of the metal electrode include those usually employed containing at least one of palladium, rhodium, iridium, rhenium, ruthenium, platinum, silver, tantalum, nickel, chromium, and titanium as a main ingredient.

On the other hand, it is usually preferred that the upper electrode 3b be an electrode transparent to light in a predetermined light-emitting wavelength region, e.g., a transparent electrode made of ZnO, ITO, IZO, or the like, in order to take out emission from the side opposite from the substrate 2.

ITO usually contains $In_2O_3$ and SnO at a stoichiometric composition ratio, though the content may slightly deviate therefrom. The content (mixing ratio) of $SnO_2$ with respect to $In_2O_3$ in ITO is preferably 1% to 20% by mass, more preferably 5% to 12% by mass. The content (mixing ratio) of ZnO with respect to $In_2O_3$ in IZO is usually about 12% to about 32% by mass. When a transparent substrate is used as the substrate 2 so as to take out emission from the substrate 2 side, the lower electrode 3a is formed as a transparent electrode.

The electrodes 3a, 3b may contain silicon as a main ingredient. Thus formed silicon electrode may contain polycrystal silicon (p-Si) or amorphous silicon (a-Si), or monocrystal silicon if necessary.

For securing electric conductivity, the silicon electrode is usually doped with impurities. Any dopant can be used as the impurities as long as a desirable electric conductivity can be secured. Usual dopant substances used in silicon semiconductors in general can be employed. Specifically, B, P, As, Sb, and Al are preferable. The dopant concentration in the silicon electrode is preferably about 0.001 to 5 atomic %.

The method of forming the electrodes 3a, 3b is not restricted in particular. For example, known methods such as vapor deposition, sputtering, CVD, sol-gel method, and printing/baking method can selectively be used. When the lower electrode 3a is to be contained within the insulating layer 4 made of a dielectric thick film, the lower electrode 3a is preferably formed by the same method as with the dielectric thick film.

For efficiently imparting an electric field to the light-emitting layer 5, each of the electrodes 3a, 3b preferably has a specific resistance of 1 $\Omega \cdot cm$ or less, more preferably 0.003 to 0.1 $\Omega \cdot cm$. Each of the electrodes 3a, 3b preferably has a film thickness of 50 to 2000 nm, more preferably about 100 to 1000 nm.

Insulating Layer 4

A dielectric thick film is preferably used for the insulating layer 4, and a known dielectric thick film material can be used as the material therefor. Preferred as the dielectric thick film material are those having a relatively large relative dielectric constant. For example, materials of lead titanate, lead niobate, and barium titanate types and the like are more preferable.

The specific resistance of the dielectric thick film is preferably at least $10^8$ $\Omega \cdot cm$ or greater, about $10^{10}$ to $10^{18}$ $\Omega \cdot cm$ in particular. It is preferably made of a material having a relatively high specific dielectric constant, whereas its specific dielectric constant e is preferably about 100 to 10000. The film thickness of the dielectric thick film is preferably 5 to 50 $\mu m$, more preferably 10 to 30 $\mu m$.

Though not restricted in particular, a method which can relatively easily yield a film having a predetermined thickness is preferred as the method of forming the insulating layer 4 made of such a dielectric thick film, examples of which include sol-gel method and printing/baking method. First, in an example of the procedure using the printing/baking method, a material having adjusted its granularity as appropriate is mixed with a binder, so as to yield a paste exhibiting a suitable viscosity. Subsequently, by screen printing, the paste is attached onto the substrate 2 formed with the lower electrode 3a, and then is dried, so as to yield a green sheet. Thereafter, the green sheet is baked at a predetermined temperature, whereby a thick film is obtained.

Light-Emitting Layer 5

The light-emitting layer 5 comprises a phosphor thin film containing a matrix material made of an oxide and a luminescent center, and has a multilayer configuration equivalent to EL phosphor multilayer thin films 50, 60, 70, 80 included in other embodiments of the present invention in accordance with the present invention which will be explained later. These configurations will be explained later in detail.

Second Embodiment

Figure 3:
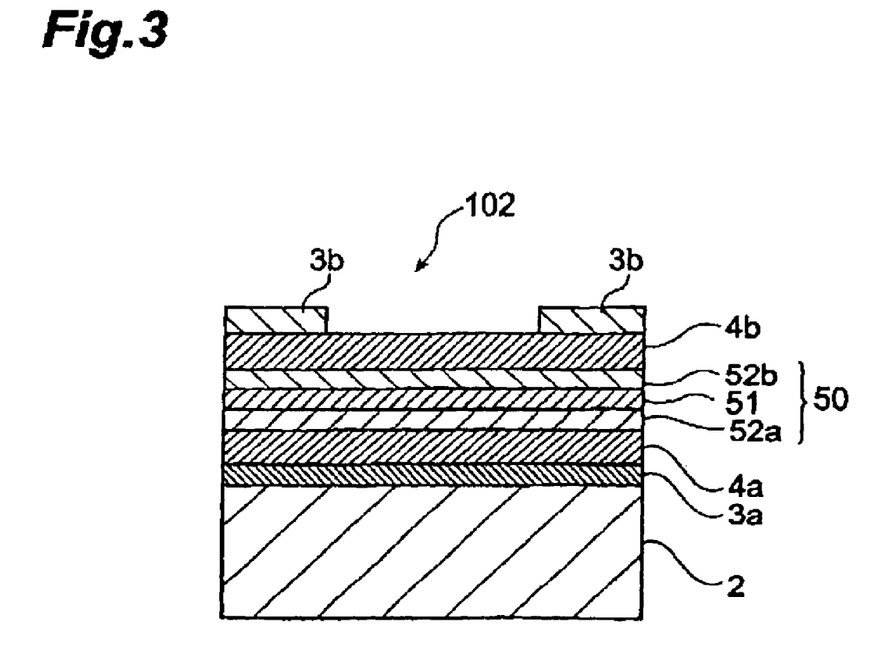
FIG. 3 is a sectional view showing a major part of a second embodiment of the EL element in accordance with the present invention.

FIG. 3 is a sectional view showing a major part of a second embodiment of the EL element in accordance with the present invention. This EL element 102 comprises a substrate 2, and a lower electrode 3a, a lower insulating layer 4a, an EL phosphor multilayer thin film 50, an upper insulating layer 4b, and an upper electrode 3b which are successively laminated on the substrate 2. The EL phosphor multilayer thin film 50 comprises a lower buffer thin film 52a, a phosphor thin film 51, and an upper buffer thin film 52b which are successively laminated from the substrate 2 side.

Insulating Layers 4a, 4b

The lower insulating layer 4a can be obtained by the same material and forming method as with the insulating layer 4 constituting the EL element 101 shown in FIG. 5.

For the upper insulating layer 4b, on the other hand, a thin film insulating layer is preferably used. Examples of its material include silicon oxide ($SiO_2$), silicon nitride ($Si_3N_4$), tantalum oxide ($Ta_2O_5$), strontium titanate ($SrTiO_3$), yttrium oxide ($Y_2O_3$), barium titanate ($BaTiO_3$), lead titanate ($PbTiO_3$), PZT, zirconia ($ZrO_2$), silicon oxynitride (SiON), alumina ($Al_2O_3$), lead niobate, PMN-PT type materials, and their multilayered or mixed thin films.

The method of forming the upper insulating layer 4b from these materials is not restricted in particular. For example, known methods such as vapor deposition, sputtering, and CVD can be used. In this case, the film thickness of the upper insulating layer 4b is preferably about 50 to 1000 nm, about 100 to 500 nm in particular. The upper insulating layer 4b may be omitted.

Phosphor Thin Film 51

The phosphor thin film 51 is constituted by the phosphor thin film of the present invention containing a matrix material made of an oxide and a luminescent center. The matrix material is not restricted in particular, examples of which include gallates such as $Ga_2O_3$, $ZnGa_2O_4$, alkaline earth gallates ($SrGa_2O_4$, $CaGa_2O_4$, $MgGa_2O_4$, etc.), alkaline earth aluminates, alkaline earth indates, $Zn_2SiO_4$, $Zn_2$(Si, Ge)$O_4$, CaO, $GeO_2$, $Y_2O_3$, $Gd_2O_3$, $Sr_2P_2O_7$, and $Y_2SiO_5$. For the luminescent center, rare-earth elements and transitional metal elements, such as Eu, Tb, Dy, Ce, Tm, Mn, Cr, Ti, and Pb, for example, may selectively be used according to target emission colors as appropriate, either one by one or in combination of two or more.

Though depending on differences in the emission mechanism caused by the combination of luminescent center and oxide matrix material (host), it is usually preferred that the luminescent center content be 0.1 to 10 atomic % with respect to the host material.

For yielding an EL element excellent in both light-emitting luminance and light-emitting efficiency, the film thickness of the phosphor thin film 51 is preferably 50 to 700 nm, more preferably 100 to 300 nm. If the film thickness exceeds 700 nm, the driving voltage may rise disadvantageously, while the light-emitting layer 5 may be easier to peel off. If the film thickness is less than 50 nm, the light-emitting efficiency may decrease.

For forming such a phosphor thin film 51 made of the phosphor thin film of the present invention, a vapor deposition method explained in the following is preferably used, for example. Here, its procedure will be explained in terms of the phosphor thin film 51 made of $MgGa_2O_4$:Eu by way of example.

First, as evaporation sources for forming an $MgGa_2O_4$:Eu film, magnesium oxide pellets doped with Eu as a luminescent center, and gallium oxide pellets are prepared Subsequently, a substrate 2 formed with a lower electrode 3a by a known method and these pellets are installed within a vacuum chamber (processing chamber) having an oxygen gas introduced therein, and double EB (electron beam) vapor deposition is carried out. Performing this vapor deposition processing for a predetermined period of time forms a phosphor thin film 51 in which the $MgGa_2O_4$:Eu film is deposited.

Here, the oxygen gas is introduced in order to prevent the amount of oxygen from coming short in the formed thin film. The oxygen gas acts with evaporated substances, so as to generate oxides as a complement to the shortage. Using the double vapor deposition as such is advantageous in that it becomes easier for a minute amount of Eu to disperse into the phosphor thin film 51 uniformly.

Eu acting as the luminescent center is added in the chemical state of metal, fluoride, oxide, or sulfide to materials. Since the Eu content in an evaporation source usually differs from that in a thin film formed by using the evaporation source, the former is adjusted so as to yield a desirable content in the thin film.

The temperature of the substrate 2 during the vapor deposition is preferably at room temperature to 600° C., more preferably 150° C. to 300° C. If the substrate temperature exceeds 600° C., irregularities may increase in excess in the surface of the light-emitting layer 5 formed, or pinholes may be likely to occur in thin films constituting the light-emitting layer 5, whereby leak current may become too high in the EL element. Also, the light-emitting layer may be tinted browns for example.

The pressure within the vacuum chamber at the time of vapor deposition is preferably $1.33 \times 10^{-4}$ to $1.33 \times 10^{-1}$ Pa ($1 \times 10^{-6}$ to $1 \times 10^{-3}$ Torr). Here, a gas such as oxygen gas can be introduced, so as to adjust the pressure to $6.65 \times 10^{-3}$ to $6.65 \times 10^{-2}$ Pa ($5 \times 10^{-5}$ to $5 \times 10^{-4}$ Torr).

When the pressure exceeds $1.33 \times 10^{-4}$ Pa, operations of E guns (electron guns) may become unstable, thus making it quite difficult to regulate the composition of the light-emitting layer 5 in some cases. Though depending on the capacity of the vacuum system (exhaust system connected to the vacuum chamber), the introduced amount of a gas such as oxygen gas is preferably 5 to 200 sccm, more preferably 10 to 30 sccm.

When necessary, the substrate 2 may be moved or rotated at the time of vapor deposition. When the substrate 2 is moved or rotated, the film thickness becomes uniform, whereby fluctuations in the film thickness distribution in the phosphor thin film can be reduced.

When the substrate 2 is rotated as such, the rotating speed is preferably at least 10 rpm, more preferably 10 to 50 rpm, about 10 to 30 rpm in particular. If the rotating speed exceeds 50 rpm, sealing may be broken in some vacuum chambers. If the rotating speed is lower than 10 rpm, fluctuations in the composition may become easier to occur in the thickness direction of the phosphor thin film 51, whereby characteristics of the phosphor thin film 51 formed may deteriorate disadvantageously.

Means for rotating the substrate 2 is not limited in particular, and can be constituted by a known rotating mechanism using a transmission mechanism/decelerating mechanism or the like combining a power source such as motor or hydraulic rotating mechanism with gears, belts, pulleys, and the like.

Without being restricted in particular, any means can be used for heating the evaporation sources and substrate 2 as long as a predetermined heat capacity, reactivity, and the like are obtained, examples of which include tantalum wire heaters, sheath heaters, and carbon heaters. The heating temperature caused by such heating means is preferably about 100° C. to about 1400° C., whereas the accuracy of temperature control is preferably ±1° C., more preferably ±0.5° C., at 1000° C.

Preferably, the formed phosphor thin film 51 is made of a highly crystalline phosphor thin film. The crystallinity of the phosphor thin film 51 can be evaluated by X-ray diffraction, for example. For enhancing the crystallinity, it will be preferable if the heating temperature of the substrate 2 is made as high as possible. It will also be effective if the formed phosphor thin film 51 is annealed in vacuum, $N_2$, Ar, S vapor, $H_2S$, air, oxygen, or the like.

In particular, it will be preferable if a thin film is formed by the above-mentioned double vapor deposition and then is annealed in an oxidizing atmosphere, since the luminance of the phosphor thin film 51 can further be enhanced thereby.

Here, air or an atmosphere having a higher oxygen concentration than that of air is preferable as the oxidizing atmosphere at the time of annealing. It is usually favorable for the annealing temperature to be set within the range of 500° C. to 1000° C., 600° C. to 800° C. in particular.

Buffer Thin Films 52a, 52b

The lower buffer thin film 52a and upper buffer thin film 52b disposed on both sides of the phosphor thin film 51 function as electron injection enhancing layers for further accelerating the electrons injected in the EL phosphor multilayer thin film 50 and injecting them into the phosphor thin film 51. Such an electron injection enhancing effect of the buffer thin films 52a, 52b can lower the emission threshold voltage of the oxide phosphor thin film, which has conventionally been 250 V or higher, to 180 V or lower.

In order for the buffer thin films 52a, 52b to fully exhibit their functions, it is desirable to control their film thickness. Specifically, the thickness of each of the buffer thin films 52a, 52b is preferably 20 to 300 nm, more preferably 50 to 200 nm. However, a more preferable film thickness may depend on the kind of oxide phosphor materials. Therefore, more specifically, the film thickness can appropriately be determined within this preferred range according to the kind of oxide phosphor material.

If the film thickness of each of the buffer thin films 52a, 52b is less than 20 nm, the above-mentioned function as the electron injection enhancing layer may deteriorate remarkably. Specifically, the emission threshold voltage may rise so that the voltage for driving the EL element to emit light may increase disadvantageously. Since the buffer thin films 52a, 52b are insulators, on the other hand, the capacitance of the EL phosphor multilayer thin film 50 may effectively increase in excess if their film thickness exceeds 200 nm, whereby the emission threshold voltage of the EL element 102 may rise disadvantageously.

Each of the buffer thin films 52a, 52b is preferably a thin film containing a sulfide, a thin film made of a sulfide in particular. Examples of the sulfide include rare-earth sulfides such as yttrium sulfide ($Y_2S_3$), zinc sulfide (ZnS), magnesium sulfide (MgS), strontium sulfide (SrS), calcium sulfide (CaS), and barium sulfide (BaS). Among these sulfides, ZnS is preferable in particular from the viewpoint of its excellent injection accelerating characteristic to the phosphor thin film 51.

For each of the buffer thin films 52a, 52b, the above-mentioned sulfides may be used one by one or in combination of two or more. They may form a mixed layer, or two or more layers of thin films having respective compositions different from each other may be used as a laminate.

The method for forming such buffer thin films 52a, 52b is not restricted in particular. For example, known methods such as vapor deposition, sputtering, CVD, and sol-gel method can be used.

Thus configured EL device 102 can remarkably enhance the electron injection efficiency into the phosphor thin film 51, since the buffer thin films 52a, 52b containing a sulfide are provided on both sides of the phosphor thin film 51 containing an oxide matrix material. This can fully lower the emission threshold voltage and realize an acute rising characteristic in an L-V curve, while being able to improve the luminance.

Third Embodiment

Figure 2:
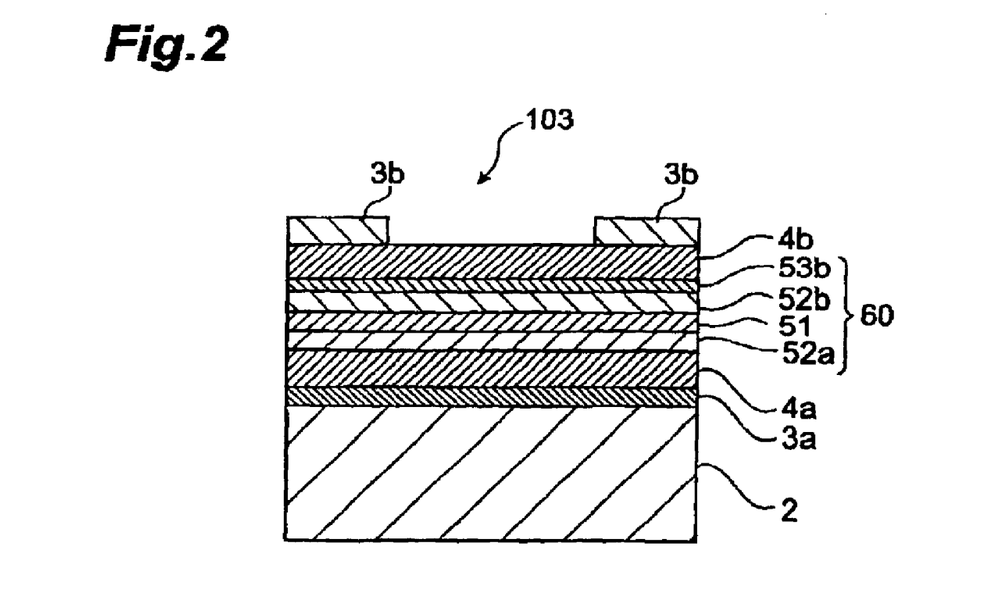
FIG. 2 is a sectional view showing a major part of a third embodiment of the EL element in accordance with the present invention.

FIG. 2 is a sectional view showing a major part of a third embodiment of the EL element in accordance with the present invention. This EL element 103 is configured in the same manner as with the EL element 102 shown in FIG. 3 except that it comprises an EL phosphor multilayer thin film 60 instead of the EL phosphor multilayer thin film 50 The EL phosphor multilayer thin film 60 is configured in the same manner as with the EL phosphor multilayer thin film 50 except that an upper electron injection thin film 53b is further formed on the upper buffer thin film 52b.

The upper electron injection thin film 53b contains an oxide and/or a nitride. The upper electron injection thin film 53b functions as a layer for injecting electrons into the phosphor thin film 51, and can further improve the luminance when provided together with the buffer thin film 52b. The upper electron injection thin film 53b will be explained in detail in the following fourth embodiment.

Fourth Embodiment

Figure 1:
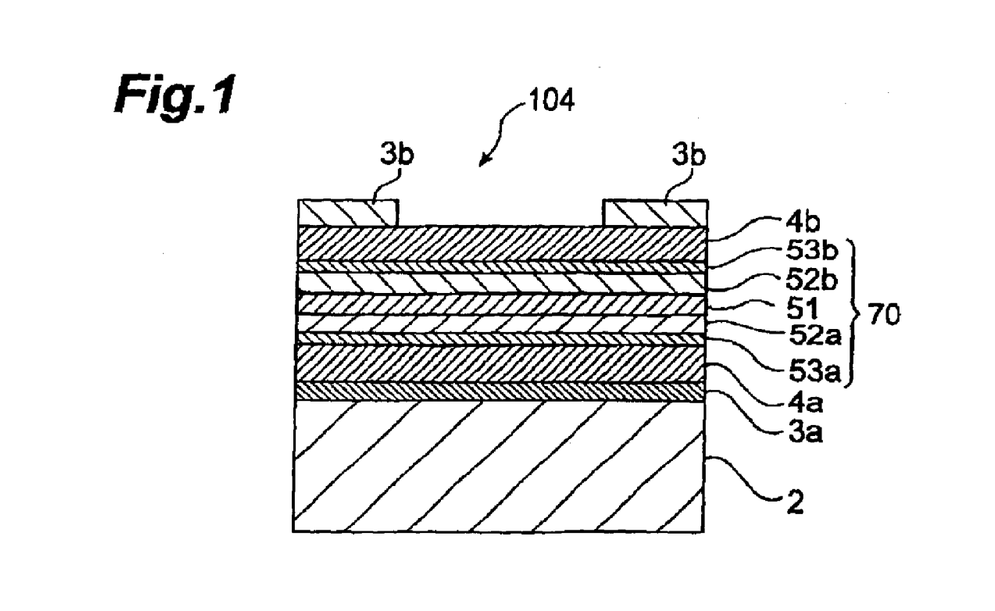
FIG. 1 is a sectional view showing a major part of a fourth embodiment of the EL element in accordance with the present invention.

FIG. 1 is a sectional view showing a major part of the fourth embodiment of the EL element in accordance with the present invention. This EL element 104 is configured in the same manner as with the EL element 103 shown in FIG. 2 except that it comprises an EL phosphor multilayer thin film 70 instead of the EL phosphor multilayer thin film 60.

The EL phosphor multilayer thin film 70 is configured in the same manner as with the EL phosphor multilayer thin film 60 except that it has a lower electron injection thin film 53a on the substrate 2 side of the lower buffer thin film 52a. Namely, in the EL element 104, the phosphor thin film 51 is provided with the buffer thin films 52a, 52b on both sides, which are further provided with the electron injection thin films 53a, 53b on both sides. This can yield a higher luminance.

Electron Injection Thin Films 53a, 53b

In order for the electron injection thin films 53a, 53b to fully exhibit their functions, it is desirable to control their film thickness as with the buffer thin films 52a, 52b. The thickness of each of the electron injection thin films 53a, 53b is preferably 5 to 150 nm, more preferably 10 to 100 nm. The thickness of the lower electron injection thin film 53a is preferably 10 to 50 nm in particular, whereas the thickness of the upper electron injection thin film 53b is preferably 10 to 70 nm in particular.

Each of the electron injection thin films 53a, 53b is preferably a thin film containing an oxide and/or nitride, i.e., a thin film containing at least one kind of oxides, nitrides, and oxynitrides, more preferably a thin film made of an oxide, a nitride, or an oxynitride.

Examples of such oxide, nitride, and oxynitride include rare earth oxides such as yttrium oxide ($Y_2O_3$), silicon oxide ($SiO_2$), silicon nitride ($Si_3N_4$), tantalum oxide ($Ta_2O_5$), strontium titanate ($SrTiO_3$), barium titanate ($BaTiO_3$), zirconia ($ZrO_2$), hafnia ($HfO_2$), silicon oxynitride (SiON), alumina ($Al_2O_3$), aluminum nitride (AlN), and gallium nitride (GaN).

Among them, from the view point of their excellent electron injection characteristic into the phosphor thin film 51, rare-earth metal oxides such as yttrium oxide ($Y_2O_3$), alumina ($Al_2O_3$), zirconia ($ZrO_2$), and hafnia ($HfO_2$) are more preferable, among which alumina ($Al_2O_3$) is preferable in particular.

For each of the electron injection thin films 53a, 53b, the materials mentioned above may be used one by one or in combination of two or more. They may form a mixed layer, or two or more layers of thin films having respective compositions different from each other may be used as a laminate.

In any case, it will be sufficient if the electron injection thin film 53a, 53b having a preferable thickness exists as the topmost layer of the EL phosphor multilayer thin film 60, 70 when the latter is annealed in an oxidizing atmosphere. As a consequence, during the annealing in the oxidizing atmosphere, the electron injection thin film 53b existing as the topmost layer functions as an oxidation control layer for preventing the phosphor thin film 51 from oxidizing in excess.

The method of forming such an electron injection thin film 53a, 53b is not restricted in particular. For example, known methods such as vapor deposition, sputtering, CVD, and sol-gel method can be used.

The above-mentioned buffer thin films 52a, 52b and electron injection thin films 53a, 53b have functions totally different from those of the insulating layers in the conventional double insulating structure shown in FIG. 5, i.e., layers for blocking electric charges. It has conventionally been unknown that the buffer thin films 52a, 52b and electron injection thin films 53a, 53b with a thickness within the above-mentioned preferable ranges are quite suitable as EL phosphor multilayer thin films.

Fifth Embodiment

Figure 4:
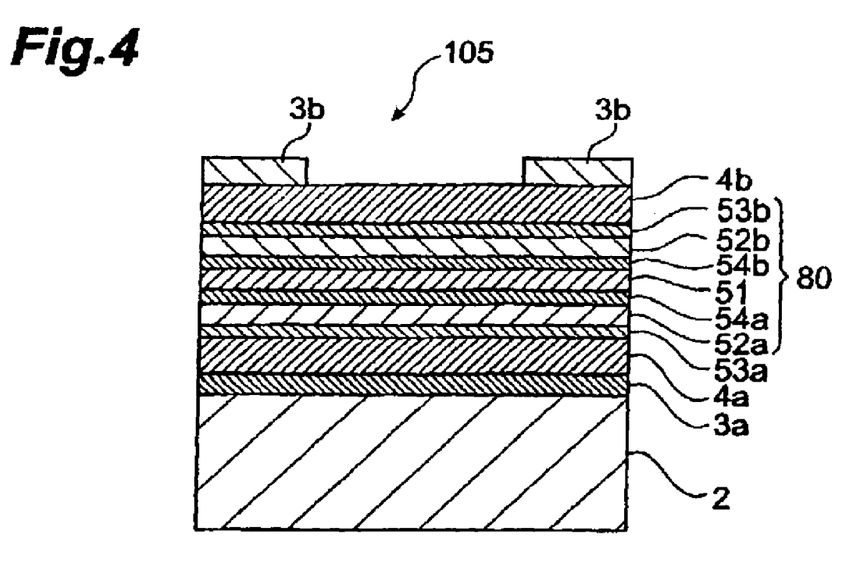
FIG. 4 is a sectional view showing a major part of a fifth embodiment of the EL element in accordance with the present invention.

FIG. 4 is a sectional view showing a major part of a fifth embodiment of the EL element in accordance with the present invention. This EL element 105 is configured in the same manner as with the EL element 104 shown in FIG. 1 except that it comprises an EL phosphor multilayer thin film 80 instead of the EL phosphor multilayer thin film 70.

The EL phosphor multilayer thin film 80 is configured in the same manner as with the EL phosphor-multilayer thin film 70 except that it has a lower intermediate layer 54a and an upper intermediate layer 54b which are disposed between the phosphor thin film 51 and the lower buffer thin film 52a, and between the phosphor thin film 51 and the upper buffer thin film 52b, respectively. Namely, in the EL element 105, the phosphor thin film 51 is provided with the intermediate layers 54a, 54b on both sides, which are provided with the buffer thin films 52a, 52b on both sides, which are further provided with the electron injection thin films 53a, 53b on both sides. This can yield a higher luminance.

Intermediate Layers 54a, 54b

Though not restricted in particular, the intermediate layers 54a, 54b are preferably constituted by a material which is excellent in compatibility with both of the phosphor thin film 51 containing an oxide matrix material and the buffer thin films 52a, 52b containing a sulfide. Specifically, it will be more preferable if each of the intermediate layers 54a, 54b is a thin film containing an oxide and/or a nitride, i.e., a thin film containing at least one kind of oxides, nitrides, and oxynitrides, a thin film made of an oxide, a nitride, or an oxynitride in particular.

Suitable examples of oxides, nitrides, and oxynitrides employable in the intermediate layers 54a, 54b include rare earth oxides such as yttrium oxide ($Y_2O_3$), silicon oxide ($SiO_2$), silicon nitride ($Si_3N_4$), tantalum oxide ($Ta_2O_5$), strontium titanate ($SrTiO_3$), barium titanate ($BaTiO_3$), zirconia ($ZrO_2$), hafnia ($HfO_2$), silicon oxynitride (SiON), alumina ($Al_2O_3$), aluminum nitride (AlN), and gallium nitride (GaN). Among them, rare earth oxides such as yttrium oxide ($Y_2O_3$), alumina ($Al_2O_3$), zirconia ($ZrO_2$), and hafnia ($HfO_2$) are preferred. When the buffer thin films 52a, 52b are ZnS thin films, the intermediate layers 54a, 54b are more preferably made of alumina ($Al_2O_3$) in particular.

The EL phosphor multilayer thin films 50, 60, 70, 80 respectively included in the EL elements 102, 103, 104, 105 in accordance with the present invention have a structure in which the phosphor thin film 51 comprising an oxide as a matrix material and the buffer thin film 52a, 52b containing a sulfide are laminated.

In general, adhesion tends to be insufficient between an oxide thin film and a sulfide thin film, whereby peeling may occur at the interface therebetween. Such peeling may be visually seen through a microscope, and can indirectly be verified by a point with no emission (dark spot) usually observed when the thin films are continuously driven as an EL element. Namely, the dark spot is considered to occur because of minute peeling generated within a multilayer thin film.

Each of the intermediate layers 54a, 54b preferably has a thickness of 30 to 80 nm. If the thickness exceeds 80 nm, electrons injected into the phosphor thin film 51 by way of the buffer thin films 52a, 52b may remarkably lower their energy, thereby raising the driving voltage and lowering the light-emitting luminance. If the thickness is less than 30 nm, the peeling prevention effect may not be obtained sufficiently. Therefore, the intermediate layers 54a, 54b with a thickness within such a preferable range can sufficiently prevent peeling from occurring while keeping both light-emitting luminance and light-emitting efficiency from decreasing.

Though the present invention is explained in detail with reference to the embodiments in the foregoing, the present invention is not limited thereto and can be modified in various manners within the scope not deviating from the gist thereof. For example, the EL phosphor multilayer-thin film 50, 60, 70, 80 may comprise a plurality of phosphor thin films 51 instead of the single one. Here, the buffer thin films 52a, 52b may be provided alone without the electron injection thin films 53a, 53b as a matter of course. In this case, however, it is preferred that a plurality of phosphor thin films and buffer thin films 52a, 52b be laminated alternately, whereas the buffer thin films 52a, 52b exist as the outermost layers of the EL phosphor multilayer thin films 60, 70.

When further providing the electron injection thin films 53a, 53b as well, it is preferred that a plurality of structure units each comprising a plurality of phosphor thin films held between two layers of buffer thin films 52a, 52b are laminated so as to hold the electron injection thin films 53a, 53b therebetween, whereas the electron injection thin films 53a, 53b exist as the outermost layers of the EL phosphor multilayer thin film 70.

Though it is not always necessary for the buffer thin films 52a, 52b and the electron injection thin films 53a, 53b to be in contact with each other, they are preferably disposed in contact with each other from the viewpoint of enhancing the electron injection efficiency.

Further, intermediate layers may appropriately be provided between adjacent layers among the insulating layers 4, 4a, 4b, the light-emitting layer 5 or EL phosphor multilayer thin film 50, 60, 70, and the electrodes 3a, 3b from the viewpoint of further improving adhesion, alleviating stress, or controlling the reaction of layer materials. When using a thick film for the insulating layers 4, 4a, its flatness may be improved by surface polishing or attaching of a flattening layer thereto.

EXAMPLES

In the following, the present invention will further be explained with reference to Examples.

Example 1

First, a sheet to become a substrate 2 was made of a $BaTiO_3$—$PbTiO_3$ type dielectric material (having a relative dielectric constant of 2000), a lower electrode 3a made of Pd and a paste for forming an insulating layer 4 were screen-printed thereon, and they were baked together. As the material for the insulating layer 4, the same $BaTiO_3$—$PbTiO_3$ type dielectric material (having a relative dielectric constant of 2000) as with the substrate 2 was used.

Subsequently, the surface of the insulating layer 4 was polished, and a $BaTiO_3$ film having a thickness of 400 nm was formed on thus polished surface by sputtering in order to improve its flatness. Thereafter, annealing was carried out in air at 700° C., so as to form a thick insulating layer (insulating layer 4) having a thickness of 30 $\mu$m.

Then, on the insulating layer 4, the lower electron injection thin film 53a (30 nm), lower buffer thin film 52a (100 nm), phosphor thin film 51 (100 nm), upper buffer thin film 52b (100 nm), and upper electron injection thin film 53b (70 nm) were successively laminated. Here, values within parentheses indicate thickness.

The electron injection thin films 53a, 53b were formed by vapor deposition using $Al_2O_3$ pellets as an evaporation source, whereas the buffer thin films 53a, 53b were formed by vapor deposition using ZnS pellets as an evaporation source.

Further, the phosphor thin film 51 contained magnesium gallate as a matrix material, and Eu as a luminescent center; and was formed by double vapor deposition using two E guns (electron guns).

Specifically, an EB source accommodating MgO pellets doped with 15 mol % of Eu as an evaporation source and an EB source accommodating $Ga_2O_3$ pellets as an evaporation source were disposed within a vacuum chamber having introduced an oxygen gas therein. Then, the evaporation sources were evaporated simultaneously, so as to form a phosphor thin film 51 made of Mg—Ga—O:Eu on the substrate 2 rotated while being heated at 150° C. Here, the evaporation speed of the evaporation sources was adjusted such that the film forming speed of the phosphor thin film 51 became 1 nm/sec. On the other hand, the oxygen gas flow rate was 20 sccm.

Subsequently, the substrate 2 formed with the upper electron injection thin film 53b was annealed for 20 minutes in air at 700° C., whereby the EL phosphor multilayer thin film 70 of the present invention was formed.

Here, as a monitor, an Mg—Ga—O:Eu thin film was formed on an Si substrate together with the phosphor thin film 51 within the vacuum chamber, and then its composition was quantitatively determined by fluorescent X-ray analysis, whereby its atomic ratio composition (arbitrary unit) was Mg/Ga/Eu of 20.42/30.15/0.81. As a consequence, it was seen that Eu became 1.62 mol % with respect to Mg+Ga. Before carrying out this example, it had been verified that the respective Mg—Ga—O:Eu thin films deposited on the Si substrate and substrate 2 yielded the same chemical composition.

Then, an upper electrode 3b made of an ITO transparent electrode having a film thickness of 200 nm was formed on the EL phosphor multilayer thin film 70 at a substrate temperature of 250° C. by RF magnetron sputtering using an ITO target, so as to yield an EL element applicable to an EL panel having a configuration equivalent to that of the EL panel 104 shown in FIG. 1.

Characteristic Evaluation 1

Electrodes were drawn from the lower electrode 3a and upper electrode 3b of the lower electrode 3a and upper electrode 3b of the EL element obtained by Example 1, and a bipolar electric field having a pulse width of 40 $\mu$s at 1 kHz was applied thereto, whereby emission characteristics were measured. As a result, red light emission at (0.66. 0.34) on a CIE 1931 chromaticity chart having a luminance of 1200 cd/m$^2$ at an applied voltage of 300 V was obtained with a favorable reproducibility. The emission threshold voltage was 148 V, whereby it was seen that the emission threshold could greatly be lowered as compared with conventional EL phosphors using oxide phosphors.

From this fact, it can be seen that a full-color panel constructed by the phosphor thin film of the present invention can reduce its driving voltage, thereby lowering its driving power. Thus, it has been verified that phosphor thin film in accordance with the present invention and the EL element and EL panel using the same are quite useful in practice.

Example 2

While using a multilayer structure comprising a lower electron injection thin film 53a (50 nm), a lower buffer thin film 52a (100 nm), an intermediate layer 54a (0 nm) formed from $Al_2O_3$ by vapor deposition, a phosphor thin film 51 (100 nm) made of Ga—O:Eu, an intermediate layer 54b (0 nm) formed from $Al_2O_3$ by vapor deposition, an upper buffer thin film 52b (100 nm), and an upper electron injection thin film 53b (50 nm) as a standard configuration, various EL elements were prepared in the same manner as with Example 1 except that the thickness of electron injection thin films 53a, 53b, the thickness of buffer thin films 52a, 52b, or the thickness of intermediate layers 54a, 54b was changed as shown in Tables 1 to 4.

Here, the phosphor thin film 51 made of Ga—O:Eu was formed as follows by multiple vapor deposition using two E guns. First, an EB source accommodating $Eu_2O_3$ pellets and an EB source accommodating $Ga_2O_3$ pellets as an evaporation source were disposed within a vacuum chamber having introduced an oxygen gas therein. Then, the evaporation sources were evaporated simultaneously, so as to form a phosphor thin film 51 on the substrate 2 rotated while being heated at 150° C. Here, the evaporation speed of the evaporation sources was adjusted such that the film forming speed of the phosphor thin film 51 became 1 nm/sec. On the other hand, the oxygen gas flow rate was 20 sccm.

Here, as a monitor, a Ga—O:Eu thin film was formed on an Si substrate together with the phosphor thin film 51 within the vacuum chamber, and then its composition was quantitatively determined by fluorescent X-ray analysis, whereby it was seen that the Eu doping amount in the thin film was 6.80 mol % with respect to Ga. Before carrying out this example, it had been verified that the respective Ga—O:Eu thin films deposited on the Si substrate and substrate 2 yielded the same chemical composition.

Characteristic Evaluation 2

For various EL elements obtained by Example 2, emission characteristics were measured as in the characteristic evaluation 1 and, based thereon, the dependence of emission characteristics on the thickness of each film was evaluated. Tables 1 to 3 collectively show results. For evaluating effects of the intermediate layers 54a, 54b, emission characteristics were measured after an hour of continuous driving. FIG. 4 shows results.

TABLE 1

| Upper/lower buffer thin film thickness (nm) | Emission threshold voltage (V) | Luminance (cd/m$^2$) |
|---|---|---|
| 0 | 250 | 80 |
| 25 | 170 | 1131 |
| 50 | 130 | 1743 |
| 75 | 140 | 1650 |
| 100 | 130 | 1497 |

TABLE 2

| Upper electron injection thin film thickness (nm) | Emission threshold voltage (V) | Luminance (cd/m$^2$) |
|---|---|---|
| 0 | 100 | 500 |
| 10 | 100 | 1721 |
| 30 | 110 | 1966 |
| 50 | 120 | 1694 |
| 70 | 130 | 1444 |

TABLE 3

| Lower electron injection thin film thickness (nm) | Emission threshold voltage (V) | Luminance (cd/m$^2$) |
|---|---|---|
| 0 | 100 | 1500 |
| 10 | 120 | 1816 |
| 30 | 120 | 1980 |
| 50 | 130 | 1542 |
| 70 | 150 | 1227 |

TABLE 4

| Upper/lower intermediate layer thickness (nm) | Emission threshold voltage (V) | Luminance (cd/m$^2$) |
|---|---|---|
| 0 | dark spot occurred | — |
| 20 | dark spot occurred | — |
| 50 | 150 | 1469 |
| 70 | 150 | 1442 |
| 100 | 180 | 839 |

These results have verified that laminating a buffer thin film having a predetermined thickness with a phosphor thin film can remarkably lower the emission threshold voltage and greatly improve the luminance. It has also been found that laminating an electron injection thin film having a predetermined thickness in addition to the buffer thin film can further improve the luminance without substantially raising the emission threshold voltage. Further, it has been seen that providing an intermediate layer having a predetermined thickness between the phosphor thin film and the buffer thin film can prevent dark spots, which may cause the peeling of a multilayer thin film when driven continuously, from occurring, whereby the life of EL element can be elongated.

Tables 1 to 3 include results of EL elements having the above-mentioned standard configuration one by one. When they are compared with each other, minute fluctuations are seen in emission characteristics because of delicate differences among their manufacturing conditions. However, it can be seen that a very low emission threshold voltage and a high luminance are fully achieved in any of them.

As explained in the foregoing, the EL phosphor multilayer thin film in accordance with the present invention can lower the emission threshold voltage of the EL element and improve its luminance and life characteristics. Therefore, when employing an oxide material in an EL element and an EL panel, its practicality is enhanced greatly. Hence, the EL phosphor multilayer thin film of the present invention and an EL element comprising the same can realize a full-color panel for a display having sufficient emission characteristics.

What is claimed is:

1. An EL phosphor multilayer thin film disposed on a substrate, said EL phosphor multilayer thin film comprising, successively laminated from said substrate side, a lower buffer thin film containing a sulfide, a phosphor thin film containing a matrix material made of an oxide and a luminescent center, an upper buffer thin film containing a sulfide, and an intermediate layer, disposed between said phosphor thin film and at least one of said lower and upper buffer thin films, containing at least one of an oxide and a nitride.

2. An EL phosphor multilayer thin film according to claim 1, wherein each of said lower and upper buffer thin films has a thickness of 20 to 300 nm.

3. An EL phosphor multilayer thin film according to claim 1, wherein said sulfide contained in said lower and upper buffer thin films is zinc sulfide.

4. An EL phosphor multilayer thin film according to claim 1, wherein said intermediate layer has a thickness of 30 to 80 nm.

5. An EL phosphor multilayer thin film according to claim 1, further comprising at least one of an upper electron injection thin film, disposed on a side of said upper buffer thin film opposite from the side provided with said phosphor thin film, containing at least one of an oxide and a nitride; and a lower electron injection thin film, disposed between said substrate and said lower buffer thin film, containing at least one of an oxide and a nitride.

6. An EL phosphor multilayer thin film according to claim 5, wherein at least one of said upper and lower electron injection thin films has a thickness of 5 to 150 nm.

7. An EL phosphor multilayer thin film according to claim 5, wherein said oxide contained in at least one of said upper and lower electron injection thin films is aluminum oxide.

8. An EL element comprising:
   a substrate; and
   a lower buffer thin film containing a sulfide, a phosphor thin film containing a matrix material made of an oxide and a luminescent center, and an upper buffer thin film containing a sulfide successively laminated on said substrate from said substrate side, and
   an intermediate layer, disposed between said phosphor thin film and at least one of said lower and upper buffer thin films, containing at least one of an oxide and a nitride.

* * * * *